United States Patent
Nammi et al.

(10) Patent No.: US 9,148,260 B2
(45) Date of Patent: Sep. 29, 2015

(54) METHOD AND APPARATUS RELATING TO HARQ PROCESSES

(75) Inventors: Sairamesh Nammi, Stockholm (SE); Namir Lidian, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 626 days.

(21) Appl. No.: 13/520,758

(22) PCT Filed: May 29, 2012

(86) PCT No.: PCT/SE2012/050572
§ 371 (c)(1),
(2), (4) Date: Jul. 5, 2012

(87) PCT Pub. No.: WO2013/147663
PCT Pub. Date: Oct. 3, 2013

(65) Prior Publication Data
US 2013/0250747 A1    Sep. 26, 2013

Related U.S. Application Data

(60) Provisional application No. 61/615,557, filed on Mar. 26, 2012.

(51) Int. Cl.
*H04L 1/18* (2006.01)
*H04L 12/26* (2006.01)
(Continued)

(52) U.S. Cl.
CPC .............. *H04L 1/1822* (2013.01); *H04L 1/1887* (2013.01); *H04L 1/0026* (2013.01); *H04L 1/06* (2013.01); *H04L 1/1671* (2013.01); *H04L 1/1812* (2013.01); *H04L 43/0847* (2013.01)

(58) Field of Classification Search
CPC ....... H04L 1/0026; H04L 1/06; H04L 1/1671; H04L 1/1812; H04L 1/1822; H04L 1/1887; H04L 43/0847
USPC .......................................................... 370/216
See application file for complete search history.

(56) References Cited

U.S. PATENT DOCUMENTS

2008/0019434 A1* 1/2008 Kim et al. ...................... 375/232
2010/0074208 A1 3/2010 Farajidana et al.
(Continued)

FOREIGN PATENT DOCUMENTS

| EP | 2234308 A1 | 9/2010 |
| WO | 2010002319 A2 | 1/2010 |
| WO | 2011102697 A2 | 8/2011 |

OTHER PUBLICATIONS

Susitaival, R. et al. "Internet access performance in LTE TDD." 2010 IEEE 71st Vehicular Technology Conference, May 16-19, 2010, pp. 1-5, Taipei, Taiwan.
3rd Generation Partnership Project. "4-branch MIMO for HSDPA." 3GPP TSG RAN WG1 Meeting #65, R1-111763, May 9-13, 2011, pp. 1-17, Barcelona, Spain.
3rd Generation Partnership Project. "Data Bundling in a 2 codeword MIMO System." 3GPP TSG-RAN WG1 #68, R1-120356, Feb. 6-10, 2012, pp. 1-9, Dresden, Germany.
(Continued)

*Primary Examiner* — Huy D Vu
*Assistant Examiner* — Stephen J Clawson
(74) *Attorney, Agent, or Firm* — Murphy, Bilak & Homiller, PLLC

(57) ABSTRACT

A method in a radio receiver arrangement for receiving data blocks of radio signalling. The method comprises receiving a plurality of data blocks over a radio interface from a transmitting side. The method also comprises applying a single hybrid automatic repeat request (HARQ) process to the plurality of data blocks, whereby it is determined that at least one of the plurality of data blocks has been received ok and that at least one of the plurality of data blocks has not been received ok. The method also comprises generating a negative acknowledgement (NAK) for the plurality of data blocks in response to the at least one of the plurality of data blocks having not been received ok. The method also comprises outputting, from the receiver arrangement, at least one symbol obtained from the at least one of the plurality of data blocks which has been received ok.

13 Claims, 8 Drawing Sheets

(51) Int. Cl.
  *H04L 1/00* (2006.01)
  *H04L 1/06* (2006.01)
  *H04L 1/16* (2006.01)

(56) References Cited

U.S. PATENT DOCUMENTS

2010/0158161 A1* 6/2010 Sambhwani et al. ......... 375/341
2010/0272220 A1* 10/2010 Murai et al. .................. 375/346
2012/0307775 A1   12/2012 Chung et al.

OTHER PUBLICATIONS

3rd Generation Partnership Project. "New WI: Four Branch MIMO transmission for HSDPA (feature part)." 3GPP TSG-RAN meeting #53, RP-111393, Sep. 13-16, 2011, pp. 1-6, Fukuoka, Japan.

3rd Generation Partnership Project. "New WI: Four Branch MIMO transmission for HSDPA (core part)." 3GPP TSG-RAN meeting #53, RP-111393, Sep. 13-16, 2011, pp. 1-6, Fukuoka, Japan.

3rd Generation Partnership Project. "New WI: Four Branch MIMO transmission for HSDPA (performance part)." 3GPP TSG-RAN meeting #53, RP-111393, Sep. 13-16, 2011, pp. 1-6, Fukuoka, Japan.

* cited by examiner

METHOD AND APPARATUS RELATING TO HARQ PROCESSES

TECHNICAL FIELD

The invention relates to hybrid automatic repeat request (HARQ) processes in radio communication systems.

BACKGROUND

In radio communications, a plurality of transport blocks may be bundled together when transmitted, such that a single HARQ process is used for the bundled transport blocks, instead of using a separate HARQ process for each transport block.

Multiple-input and multiple-output (MIMO) is the use of multiple antennas at both the transmitter and receiver to improve communication performance.

R1-111763 "4-branch MIMO for HSDPA", 3GPP TSG RAN WG1 Meeting #65, Barcelona, Spain, 9-13 May, 2011, proposes introducing a 4-branch MIMO for downlink HSDPA.

At RAN#53, a new work item on 4-branch MIMO transmission for HSDPA was agreed. At RAN#67, it was decided to use 2-codeword MIMO to reduce the control channel design.

R1-120356 "Data Bundling in a 2 codeword MIMO System", 3GPP TSG-RAN WG1 #68, Dresden, Germany, 6-10 Feb. 2012, discusses different options for bundling at the transmission side when using a 2 code word 4-branch MIMO. Bundling may be done at the bit level or at the symbol level.

Time-division multiplexing (TDM) is a type of multiplexing in which two or more bit streams or signals are transferred apparently simultaneously as sub-channels in one communication channel, but are physically taking turns on the channel over time. The time domain is divided into several recurrent time slots of fixed length, one for each sub-channel. Time-Division Duplex (TDD) is the application of time-division multiplexing to separate uplink (UL) and downlink (DL) signals.

SUMMARY

It has been realized by the inventors that the reception of data blocks over a radio interface when the blocks are bundled may not be optimal since a block that was received ok may still be discarded and retransmitted unless also all the other blocks of the same bundle are received ok, since there is no HARQ process for the individual block which was received ok. In accordance with the present disclosure, the handling of bundled blocks at the receiving side in radio communication is improved by reducing the burden on the receiving side for detecting and processing the received bundled data blocks.

However, bundling is advantageous, for example, in that it enables reduced signaling between entities, such as base station and user equipment (UE), in a radio access network (RAN), e.g. when using MIMO or TDM.

In a MIMO system, the number of HARQ processes/codewords is less than the number of layers or streams supported by the plurality of transmitting antennas in the system. Thus, a plurality of transmitted data blocks, e.g. transport blocks, typically relating to respective data streams/channels, are bundled together in a single HARQ process. As the receiver processes the received bundled data blocks, it determines for each data block whether it was received ok (ACK) or not (NAK). However, since all the bundled blocks are part of the same HARQ process, only one ACK or NAK, representing all the bundled blocks in combination, may be sent back to the transmitter. Thus, if only one block was poorly received (NAK) while the other(s) of the same bundle were received ok (ACK), a NAK, representing the bundle, is sent to the transmitting side and all the data blocks of the bundle are resent and again received and decoded on the receiving side. The blocks received previously, which resulted in a NAK, are all discarded, also the blocks which were received ok since the transmitting side has no knowledge of how the individual blocks were received only that the bundle as a whole was not received ok.

Also in time division multiplexing (TDM), such as TDD, transport blocks may be bundled such that an ACK/NAK transmitted back to the transmitter is associated with a plurality of bundled transport blocks. If e.g. three different bit streams (logical channels) are transmitted with TDM over a single physical channel, each in sequential dedicated time slots, the transport/data blocks of three sequential time slots (each relating to a respective stream) may be bundled in a single HARQ process. In this example, the number of bundled transport blocks may be the same as the number of streams or logical channels transmitted on the physical (transport) channel using TDM. However, bundling of more or fewer transport blocks than the number of streams may alternatively be convenient, depending on the communication standard used.

Transmission of bundled data blocks may also be convenient in other communication systems than MIMO and TDM, as will be understood by a person skilled in the art.

Table 1 Shows the four different possible combinations of two bundled data blocks being received ok or not ok at the receiving side of a radio communication. It is enough that one of the two blocks is not received ok for the receiving side to issue a NAK back to the transmitting side. Depending on the communication standard employed, the receiver side may produce ACK or NAK for each of the received data blocks, which may then by means of the HARQ process give the combined ACK or NAK for a bundle of blocks.

TABLE 1

| | Received OK? | Feedback to transmitter |
|---|---|---|
| Block 1 | OK | ACK |
| Block 2 | OK | |
| Block 1 | OK | NAK |
| Block 2 | Not OK | |
| Block 1 | Not OK | NAK |
| Block 2 | OK | |
| Block 1 | Not OK | NAK |
| Block 2 | Not OK | |

The inventors have realized that instead of discarding the data block(s) which have been received ok just because they were bundled with data block(s) which were not received ok, resulting in a NAK as feedback to the transmitter side, these correctly received data blocks may be used in order to reduce the burden on the receiving side for detecting and processing the bundled data blocks when they are re-transmitted as a result of the fed back NAK, thus conserving power e.g. in a UE if the transmission is downlink (DL). The receiving side knows which data blocks of the bundle were received ok, why it may keep these and only process (decode, despread etc. as needed) the data blocks which were not received ok when the data blocks of the bundle are retransmitted. Thus, processing resources and electric/battery power may be conserved by not processing (decoding and/or de-spreading etc. as needed depending on the communication standards used) the received data blocks to obtain data symbols. The symbols obtained from the data blocks which were received ok, before the retransmission of the bundled data blocks, may be kept, e.g. stored and/or outputted from a receiver arrangement of the receiver side, such as the receiver 500 of any of the embodiments illustrated in FIGS. 6 and 8-9 discussed below. Additionally, e.g. in a MIMO system, the ok received data block(s) may be used in order to remove interference of these data blocks on the data blocks not received ok, when the bundled data blocks are retransmitted. Thus, the probability of the data blocks previously not received ok being received ok upon retransmission may be increased since interference from the data block(s) already received ok may be reduced or removed.

In view of this realization, aspects and embodiments of the present disclosure have been formed and are presented in the following.

According to an aspect of the present disclosure, there is provided a method in a radio receiver arrangement for receiving data blocks of radio signalling. The method comprises receiving a plurality of data blocks over a radio interface from a transmitting side. The method also comprises applying a single hybrid automatic repeat request (HARQ) process to the plurality of data blocks, whereby it is determined that at least one of the plurality of data blocks has been received ok and that at least one of the plurality of data blocks has not been received ok. The method also comprises generating a negative acknowledgement (NAK) for the plurality of data blocks in response to the at least one of the plurality of data blocks having not been received ok. The method also comprises outputting, from the receiver arrangement, at least one symbol obtained from the at least one of the plurality of data blocks which has been received ok.

According to another aspect of the present disclosure, there is provided a receiver arrangement comprising a processor. The processor is configured for receiving a plurality of data blocks over a radio interface from a transmitting side. The processor is also configured for applying a single hybrid automatic repeat request (HARQ) process to the plurality of data blocks, whereby it is determined that at least one of the plurality of data blocks has been received ok and that at least one of the plurality of data blocks has not been received ok. The processor is also configured for generating a negative acknowledgement (NAK) for the plurality of data blocks in response to the at least one of the plurality of data blocks having not been received ok. The processor is also configured for outputting, from the receiver arrangement, at least one symbol obtained from the at least one of the plurality of data blocks which has been received ok.

An embodiment of the receiver arrangement of the present disclosure may be used for performing an embodiment of the method of the present disclosure.

An embodiment of the present disclosure may be comprised in a radio communication device, such as a user equipment (UE) or a network node, e.g. a Node B or an evolved Node B.

According to another aspect of the present disclosure, there is provided a user equipment comprising an embodiment of the receiver arrangement of the present disclosure.

According to another aspect of the present disclosure, there is provided a network node comprising an embodiment of the receiver arrangement of the present disclosure.

According to another aspect of the present disclosure, there is provided a computer program product comprising computer-executable components for causing a receiver arrangement to perform an embodiment of a method of the present disclosure when the computer-executable components are run on a processor associated with the receiver arrangement.

According to another aspect of the present disclosure, there is provided a computer program for receiving data blocks of radio signaling. The computer program comprises computer program code which is able to, when run on a processor associated with a receiver arrangement, cause the receiver arrangement to receive a plurality of data blocks over a radio interface from a transmitting side. The computer program code is also able to cause the receiver arrangement to apply a single hybrid automatic repeat request (HARQ) process to the plurality of data blocks, whereby it is determined that at least one of the plurality of data blocks has been received ok and that at least one of the plurality of data blocks has not been received ok. The computer program code is also able to cause the receiver arrangement to generate a negative acknowledgement (NAK) for the plurality of data blocks in response to the at least one of the plurality of data blocks having not been received ok. The computer program code is also able to cause the receiver arrangement to output, from the receiver arrangement, at least one symbol obtained from the at least one of the plurality of data blocks which has been received ok.

According to another aspect of the present disclosure, there is provided a computer program product comprising an embodiment of a computer program of the present disclosure and a computer readable means on which the computer program is stored.

In some embodiments of the method of the present disclosure, the method comprises sending the NAK to the transmitting side; and receiving retransmission(s) of the plurality of data blocks in a single HARQ process until a positive acknowledgement (ACK) is generated for the plurality of data blocks in response to all of the plurality of data blocks having been received ok.

Correspondingly, in some embodiments, the processor of the receiver arrangement is configured for sending the NAK to the transmitting side; and receiving retransmission(s) of the plurality of data blocks in a single HARQ process until a positive acknowledgement (ACK) is generated for the plurality of data blocks in response to all of the plurality of data blocks having been received ok.

In some embodiments of the method of the present disclosure, the symbols of a retransmitted data block, which data block has previously been received ok, are not decoded. Thus, the symbols of a retransmitted data block are not used/decoded if the symbols may already have been received ok and decoded from a previous transmission of the same data block.

In some embodiments of the method of the present disclosure, the method comprises reconstructing the at least one data block that was received ok; and subtracting the reconstructed data block from the received retransmitted plurality of data blocks. Thereby, interference created by the data blocks already received ok is removed from the data blocks not yet received ok, of the same bundle of data blocks. The subtracting may comprise successive interference cancellation (SIC).

Correspondingly, in some embodiments, the processor of the receiver arrangement is configured for reconstructing the at least one data block that was received ok; and subtracting the reconstructed data block from the received retransmitted plurality of data blocks.

In some embodiments of the method of the present disclosure, the method comprises reconstructing both the at least one data block that was received ok and the at least one data block that was not received ok; and subtracting the reconstructed data block that was received ok from the reconstructed data block that was not received ok. Thereby, interference created by the data blocks received ok is removed from the data blocks not received ok, of the same bundle of data blocks, without having to retransmit the bundled plurality of data blocks. The subtracting may comprise successive interference cancellation (SIC). If this internal interference reduction fails for one or more of the data blocks, the bundle is retransmitted and interference reduction from the retransmitted signal may be attempted (see previous paragraph).

Correspondingly, in some embodiments, the processor of the receiver arrangement is configured for reconstructing both the at least one data block that was received ok and the at least one data block that was not received ok; and subtracting the reconstructed data block that was received ok from the reconstructed data block that was not received ok.

In some embodiments, the receiver arrangement is configured for multiple input multiple output (MIMO) radio communication, and the plurality of data blocks are received via respective antennas.

In some embodiments, the receiver arrangement is configured for time division duplex (TDD) radio communication.

In some embodiments, whether each of the plurality of data blocks is received ok is determined by means of an error detection code included in each of the received data blocks. The error detection code may be a cyclic redundancy check (CRC) code.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

Figure 1:
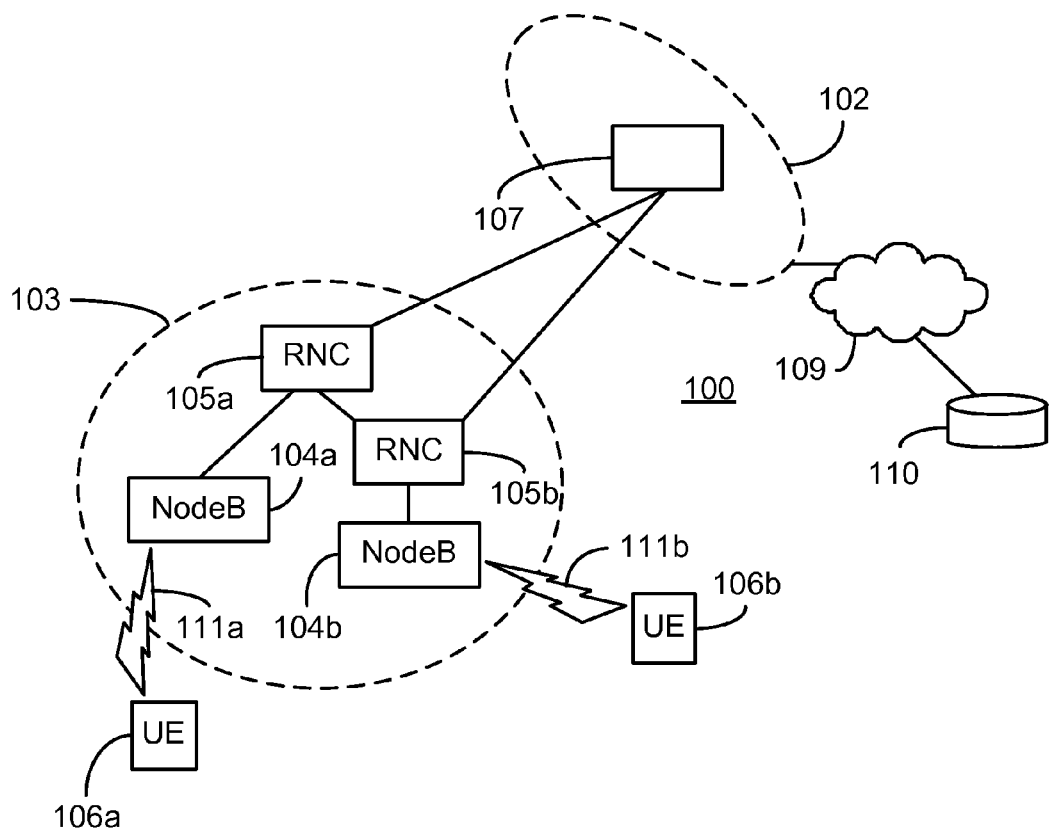
FIG. 1 schematically illustrates an embodiment of a mobile communication system.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description. Whether or not a data block is received ok may be determined by means of an error detection code, such as a cyclic redundancy check (CRC) code, included in each of the transmitted data blocks. If the a data block has been determined to have been received ok (passed the CRC), the data symbols obtained from that data block may be regarded as being correct and may be used further (e.g. transferred to other/higher layers or parts of the receiving side). Since the receiving side is aware of any data blocks of a bundle which have been received ok even if not all of the bundled blocks were received ok, the data blocks which were received ok may be used, instead of discarded, e.g. transferred to other/higher layers or parts of the receiving side, even before the other blocks of the bundle have been received ok e.g. by retransmission of the bundle and/or by internal interference reduction.

The receiver arrangement may e.g. be configured for MIMO radio communication and/or TDM/TDD radio communication and/or any other communication standard where transmitted data blocks may be bundled.

As mentioned above, correctly received data block(s) may be used in order to reduce the burden on the receiving side for detecting and processing the bundled data blocks. The correctly received data block(s) may e.g. be used to subtract them from the transmission of the bundle, thus removing interference from the block(s) not received ok increasing the probability of receiving those block(s). This may be done e.g. for the retransmitted bundle or, internally, on the bundle already received, as discussed below.

If a data block bundle is retransmitted, any data block(s) of that bundle which have previously been received ok may be used in order to reduce or remove interference (e.g. in a detector of the receiver arrangement) from the retransmitted data blocks of the bundle which, before the retransmission, have not yet been received ok. In order to achieve this, the ok received data blocks may be reconstructed, e.g. by processing the obtained symbols from the ok data blocks in reverse (e.g. by spreading and/or coding etc. as needed depending on the communication standard). The reconstructed data block(s) may then be subtracted (e.g. in a detector of the receiver arrangement) from the retransmitted bundled data blocks, thus removing or at least reducing any interference from the data block(s) previously received ok from the data block(s) not yet received ok. The subtraction, i.e. interference reduction/removal, may e.g. be a type of Successive Interference Cancellation (SIC) or any other interference reduction process.

If any but not all data blocks of a bundle is/are received ok, an internal interference reduction may be performed in the receptor arrangement before sending a NAK to the transmitting side for that bundle. For instance, the block(s) which was not received ok may be reprocessed (e.g. decoded and/or de-spread etc. as needed depending on the communication standard) with subtraction of the data block(s) which were received ok. The subtraction may e.g. be done with the data blocks in the form which they were transmitted, why the data blocks of the bundle (blocks received ok and/or blocks not received ok) may be reconstructed, possibly in the same way as discussed above, by processing the obtained symbols from the ok data blocks in reverse (e.g. by spreading and/or coding etc. as needed depending on the communication standard). This may be a type of internal SIC, or other interference reduction process, which may be used to avoid retransmission or at least reduce the number of retransmissions needed. According to this embodiment of the present invention, there may not need to be any retransmission of the bundled data blocks at all. If the internal interference reduction fails to achieve ok reception of all data blocks in the bundle, a NAK may be sent to the transmitting side and interference reduction of the retransmitted data blocks may be performed as discussed above.

The present disclosure may be useful in any radio/wireless communications where transmitted data blocks are bundled, or put another way, where the number of data blocks exceeds the number of HARQ processes. The HARQ process(es) may e.g. be associated with incremental redundancy coding. Above, a system where at least two data blocks are bundled and subjected to one HARQ process has been discussed. However, the present invention may be useful for any number of HARQ processes and any number of data blocks according to any radio/wireless communication standard as long as the number of data blocks being subjected to an HARQ process exceeds the number of active HARQ processes at a given time, or put another way, as long as at least two data blocks are bundled together.

The disclosure is herein exemplified with a 4-branch MIMO (i.e. using four antennas at both the transmitter and the receiver sides) and two codewords/HARQ processes. However, the disclosure may be beneficial in any system where transmitted data blocks are bundled, such as in a MIMO system where the number of antennas used at the receiver side is higher than the number of HARQ processes, or as in TDM.

Herein, the embodiments are described using HARQ. However, the person skilled in the art will realize that other similar current or future such processes may be equivalently used.

Herein, the disclosure is exemplified with high-speed downlink packet access (HSDPA). However, the disclosure may be beneficial with any communication standard where transmitted data blocks may be bundled, such as HSDPA, General Packet Radio Service (GPRS), Wideband Code Division Multiple Access (WCDMA), Long Term Evolution (LTE), Global System for Mobile Communications (GSM), Bluetooth, Worldwide Interoperability for Microwave Access (WiMAX), Institute of Electrical and Electronic Engineering (IEEE) standards, two-way broadband satellite multimedia access, Time Division Multiple Access (TDMA), Frequency Division Multiple Access (FDMA), Digital Video Broadcasting-Return Channel via Satellite (DVB-RCS), or any other radio communication standard. Thus, the radio nodes discussed herein may e.g. be a Node B (e.g. according to WCDMA), an LTE eNode B or a WiFi access point (AP). Correspondingly, the UEs discussed herein, may be any radio communication terminal e.g. any type of mobile device, cell phone or portable computer, or any other mobile communication terminal or any type of stationary terminal such as sensors, vending machines, household appliances etc, conveniently supporting bundling of data blocks in an HARQ process.

The term "data block" as used herein denotes any block of data to be sent over a radio interface and may comprise data and an error detection code such as cyclic redundancy check (CRC). A data block may e.g. be a transport block as defined in any radio communication standard.

The term "codeword" as used herein denotes a codeword corresponding to an HARQ process. In a system with one HARQ process, there is one codeword, and in a system with two HARQ processes, there are two codewords, one for each HARQ process, and so on.

A "layer mapper" as mentioned herein, is a function which maps channels, which are to be transmitted, to the different antennas in a multiple input multiple output (MIMO) system. It may be convenient to map each channel to a respective antenna.

The term "bundling" as used herein relates to the process of bundling a plurality of data blocks, such as transport blocks, together such that only one acknowledgement/negative acknowledgement (ACK/NAK) is sent by the receiving side to the transmitting side for the bundled data blocks. Thus, the single ACK/NAK sent back is a combined ACK/NAK for all the bundled data blocks. In response to a NAK, the transmitter will resend all the bundled data blocks, since it has only received a single NAK and cannot know which of the data blocks was/were not received correctly.

The term "reconstructed signal" or "reconstructed block" and the like, as used herein, denotes received transmitted data block(s) which have been reconstructed, e.g. by means of spreading, coding etc. depending on the communication standard, from correctly received and obtained (ACK) symbols derived from transmitted data blocks which were received ok.

The term "rank" is used for stating how many antennas are used in a MIMO system. For example, a rank-4 MIMO system uses four antennas at the transmitting side and corresponding four antennas at the receiving side.

FIG. 1 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes, based on the present disclosure.

In FIG. 1 the UMTS network 100 comprises a core network 102 and a UMTS terrestrial radio access network, UTRAN, 103. The UTRAN 103 comprises a number of nodes in the form of radio network controllers, RNC, 105a, 105b, each of which is coupled to a set of neighboring nodes in the form of one or more NodeB 104a, 104b. Each NodeB 104 is responsible for a given geographical radio cell and the controlling RNC 105 is responsible for routing user and signaling data between that Node B 104 and the core network 102. All of the RNC's 105 are coupled to one another. A general outline of the UTRAN 103 is given in 3GPP technical specification TS 25.401 V3.2.0.

FIG. 1 also illustrates communicating entities in the form of user equipments, UEs, 106a, 106b connected to a respective NodeB 104a, 104b in the UTRAN 103 via a respective air interface 111a, 111b. UEs served by one Node B, such as UE 106a served by NodeB 104a, are located in a so-called radio cell. The core network 102 comprises a number of nodes represented by node 107 and provides communication services to the UE 106 via the UTRAN 103, for example when communicating with the Internet 109 where, schematically, a server no illustrates an entity with which the UEs 106 may communicate. As the skilled person realizes, the network 100 in FIG. 1 may comprise a large number of similar functional units in the core network 102 and the UTRAN 103, and in typical realizations of networks, the number of UEs may be very large.

Furthermore, as will be discussed in detail in the following, communication between the nodes in the UTRAN 103 and the UEs 106 may follow the protocols as specified by 3GPP HSDPA specifications. However, as mentioned above, the present invention may be relevant also for any other radio communication standard. In LTE for instance, the radio communication nodes RNC and Node B in FIG. 1 may be exchanged for evolved node Bs (eNode B or eNB) and positioning nodes etc according to an LTE standard.

Figure 2:
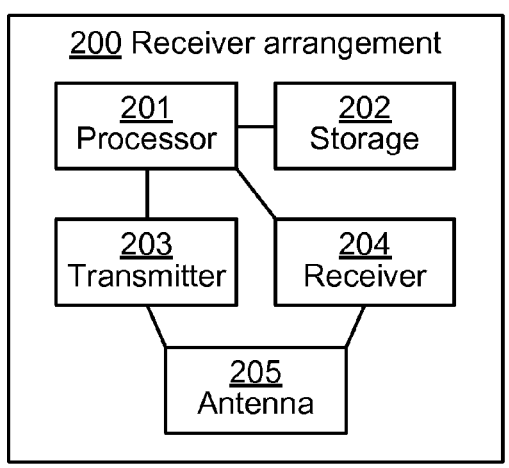
FIG. 2 is a schematic box diagram of an embodiment of a receiver arrangement of the present disclosure, FIG. 3 schematically illustrates a message sequence between a user equipment (UE) and a network node exemplified by a NodeB, FIG. 4 schematically illustrates an embodiment of a UE feedback channel.

FIG. 2 schematically illustrates an embodiment of a receiver arrangement of the present disclosure. The receiver arrangement 200 comprises a processor 201, e.g. a central processing unit (CPU). The processor 201 may comprise one or a plurality of processing units in the form of microprocessor(s). However, other suitable devices with computing capabilities could be comprised in the processor 201, e.g. an application specific integrated circuit (ASIC), a field programmable gate array (FPGA) or a complex programmable logic device (CPLD). The processor 201 is configured to run one or several computer program(s) or software stored in a storage unit or memory 202. The storage unit is regarded as a computer readable means and may e.g. be in the form of a Random Access Memory (RAM), a Flash memory or other solid state memory, or a hard disk. The processor 201 is also configured to store data in the storage unit 202, as needed. The receiver arrangement 200 also comprises a transmitter 203, a receiver 204 and an antenna 205, which may be combined to form a transceiver or be present as distinct units within the receiver arrangement 200. The transmitter 203 is configured to cooperate with the processor to transform data bits to be transmitted over a radio interface to a suitable radio signal in accordance with the radio access technology (RAT) used by the radio access network (RAN) via which the data bits are to be transmitted. The receiver 204 is configured to cooperate with the processor 201 to transform a received radio signal to transmitted data bits. The antenna 205 may comprise a single antenna or a plurality of antennas, e.g. for different frequencies and/or for MIMO (Multiple Input Multiple Output) communication. The antenna 205 is used by the transmitter 203 and the receiver 204 for transmitting and receiving, respectively, radio signals. If the receiver arrangement 200 is integrated or otherwise associated with a radio communication device, the processor 201 of the receiver arrangement 200 may also function as the processor of the radio communication device, the storage unit 202 of the receiver arrangement 200 may also function as the storage unit of said device, the transmitter 203 of the receiver arrangement 200 may also function as the transmitter of said device, and/or the receiver 204 of the receiver arrangement 200 may also function as the receiver of said device.

Figure 3:
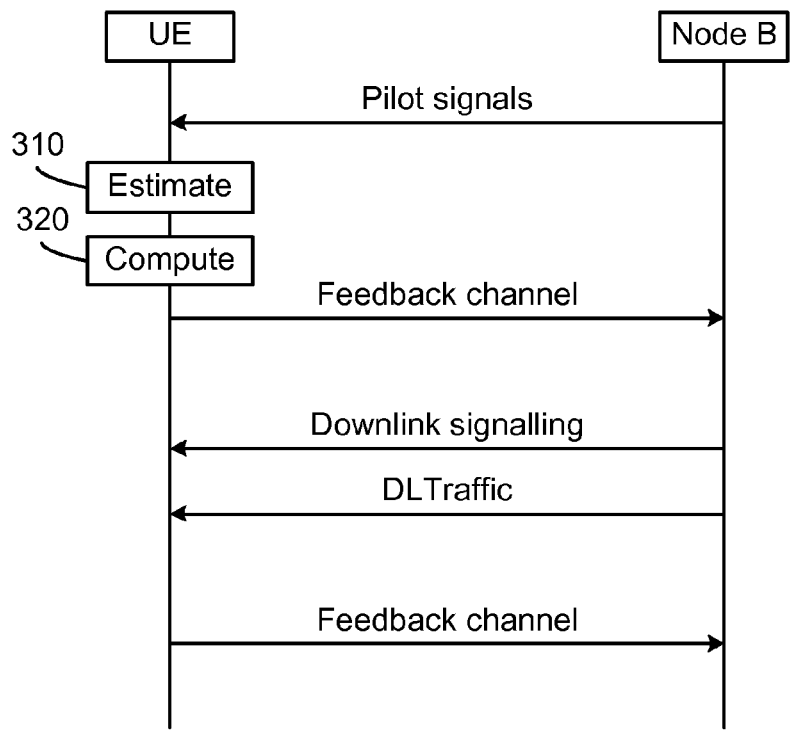
Figure 4:
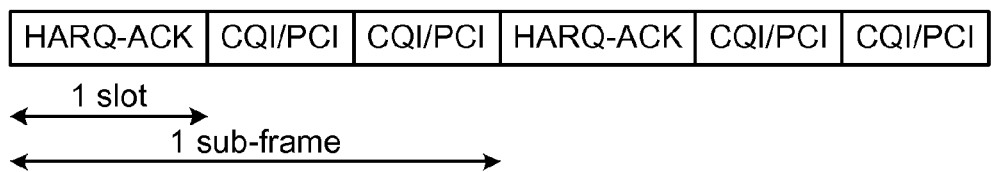

FIG. 3 shows a message sequence chart for a MIMO system comprising a NodeB and a UE, such as any of the NodeB's and UE's described above in connection with FIG. 1. As shown in FIG. 3, the UE receives pilot signals and estimates 310 the channel from the pilot signals. The UE computes 320 the channel state information from the estimated channel. The UE reports the channel state information to the Node B through feedback channel. A feedback channel report for two reporting intervals is shown in FIG. 4. As shown in FIG. 4, the feedback channel comprises acknowledgement/negative acknowledgement, ACK/NAK, information and the channel quality indicator/pre-coding control indication, CQI/PCI.

Figure 5:
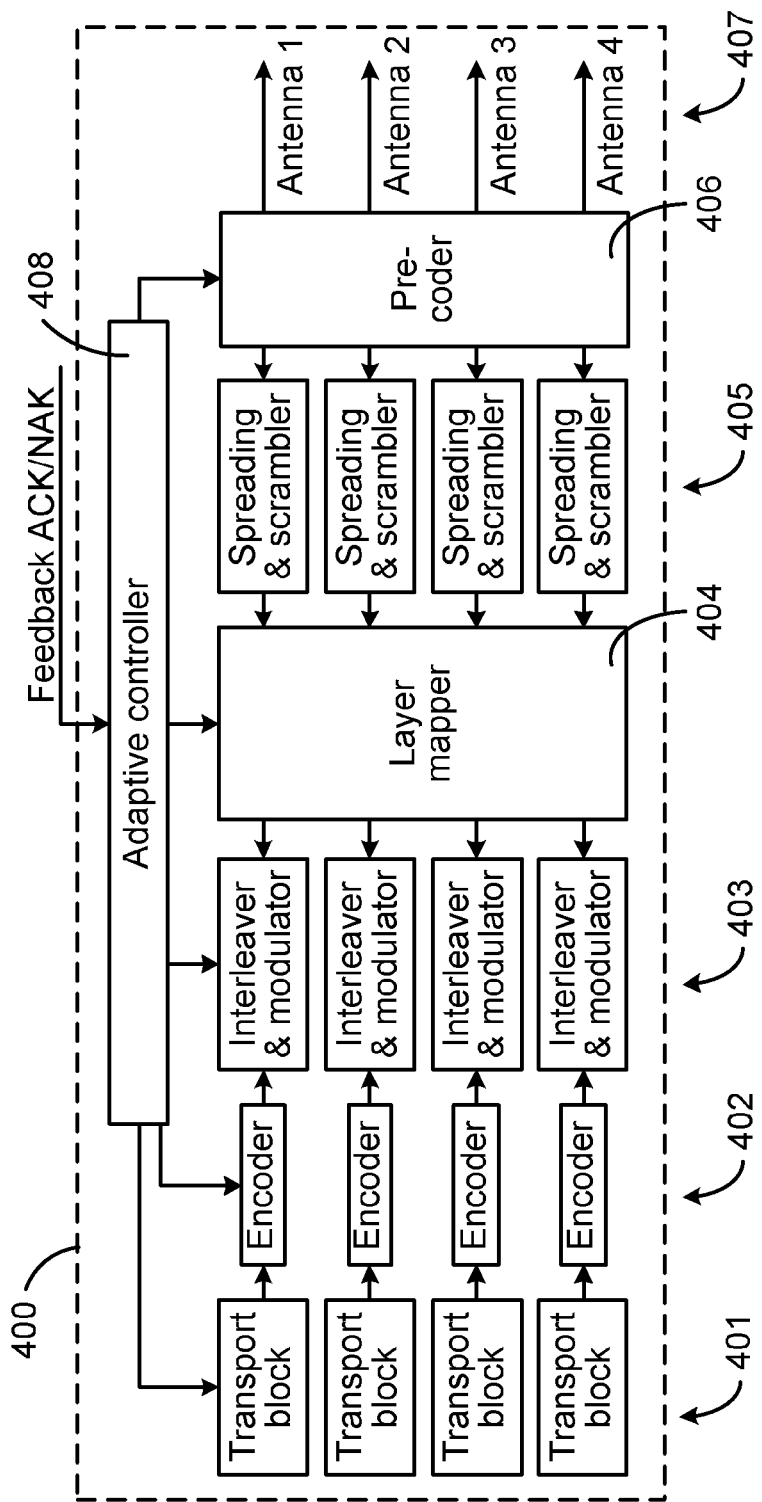
FIG. 5 is a schematic block diagram illustrating an embodiment of processing of data blocks at a transmitting side in a radio communication device.

FIG. 5 schematically shows a block diagram of an embodiment of a two code word MIMO system with four channel encoders in a transmitter 400 in a radio communication device, such as a network node, e.g. any of the NodeB's in FIG. 1. From feedback information from another radio communication device, such as a UE, the adaptive controller 408 chooses the transport block 401 length, modulation order and the coding rate. It also generates the precoding weight information. It is to be noted that even though there are four channel encoders 402, feedback information corresponding to a maximum of two code words is received, i.e., two HARQ processes. The mapping of HARQ process to the channel encoder 402/interleaver and modulator 403 can be done according to three possible combinations. Here, for simplicity, for rank 1 and 2 direct mapping is used, and for rank 3 transmissions the first HARQ process is mapped to the first two encoders 402 and the second HARQ process to the third encoder 402. Similarly for rank 4 transmissions, the first HARQ process is mapped to the first two encoders and the second HARQ process to the third and fourth encoders.

Based on the rank chosen by the adaptive controller 408, transport blocks 401 passed to the channel encoder 402 and the output is interleaved and modulated. The output of the interleaver and modulator 403 is mapped to the space time layers by the layer mapper 404. For this scheme the layers are mapped one to one. Once the layer mapping is done, the resultant symbols are spread and scrambled by means of spreader and scrambler 405. Pre-coding is applied by means of precodeer 406 on the output of the spreader and scrambler 405 and the output signal is passed to the corresponding antenna 407 (1-4) ports.

Figure 6:
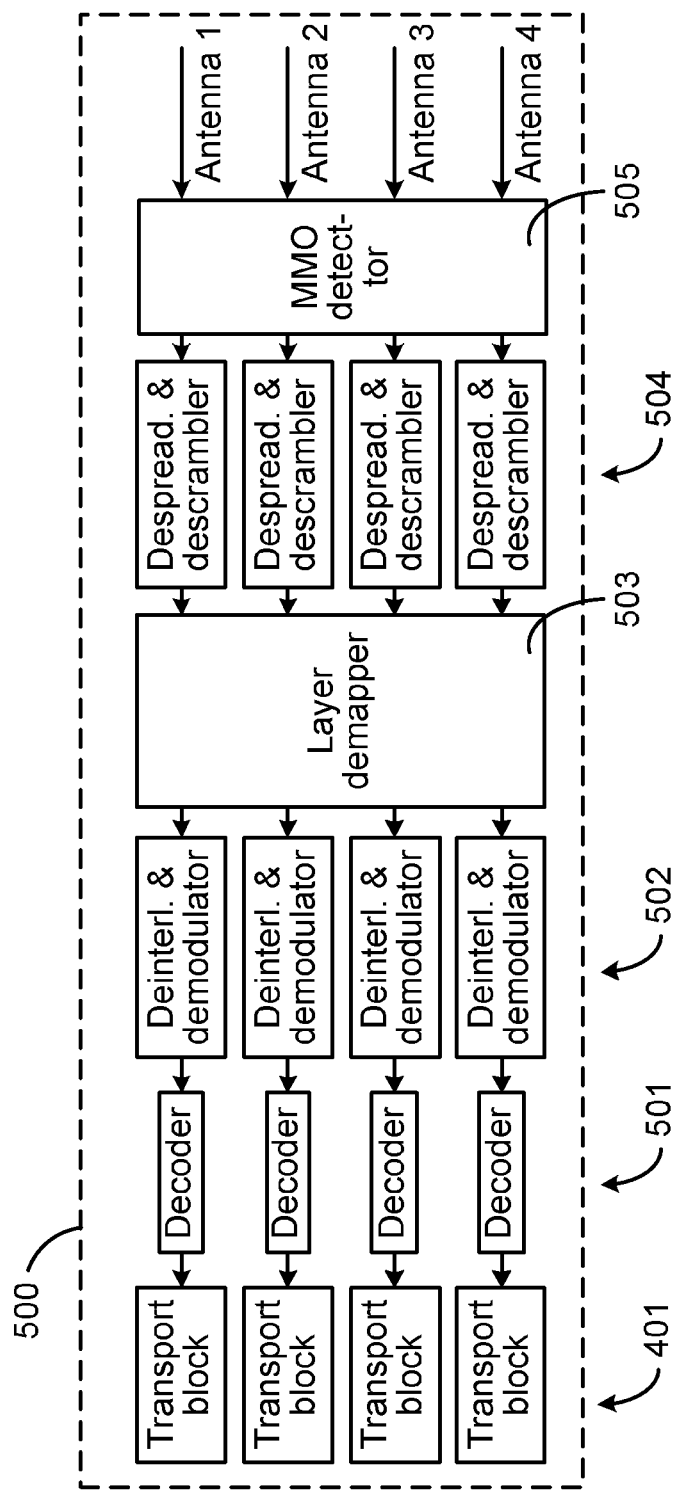
FIG. 6 is a schematic block diagram illustrating an embodiment of processing of data blocks at a receiving side in a radio communication device, FIG. 7 schematically illustrates an embodiment of a medium access control (MAC) entity in a radio communication device.

FIG. 6 schematically illustrates a block diagram showing circuitry of an embodiment of a receiver 500 in a radio communication device, such as any of the UE's in FIG. 1. From signals received via antennas 1-4, a MIMO detector 505 (e.g. a minimum mean square error, MMSE, receiver) reduces the interference from multipath and other antenna interference. The remaining blocks de-spreader & descrambler 504, layer de-mapper 503, de-interleaver & de-modulator 502 and the decoder 501 blocks do the opposite of the transmitter blocks described above in connection with FIG. 5, reconstructing the data symbols of the transmitted blocks.

It can be seen that for rank 4 transmissions, the UE gets up to four transport blocks. This may mean that, after the decoder, the UE gets four ACK/NAK's. Similarly, for rank 3 transmissions, the UE may get three ACK/NAKS. For rank 2 and rank 1 transmissions the UE may get two and one ACK/NAK, respectively. For rank 2 and rank 1 transmissions these ACK/NAKS may be directly mapped to the HARQ process.

Figure 7:
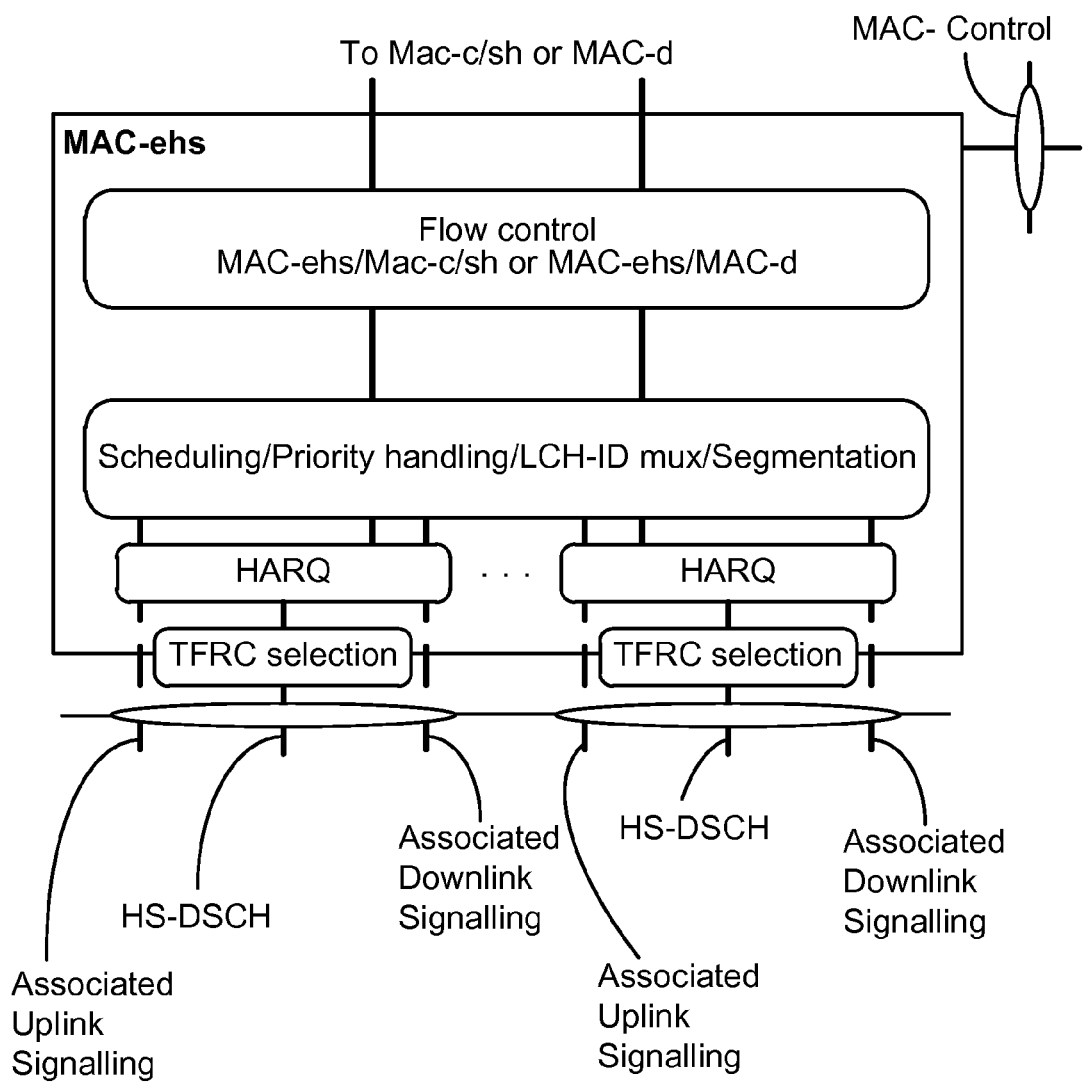

Turning now to FIG. 7, which shows a block diagram of a media access control (MAC)-ehs entity in an UE such as any of the UE's in FIG. 1. As the skilled person will realize, the MAC-ehs entity performs a number of different tasks, including HARQ processing, but for the sake of clarity only the HARQ functionality is described in the present disclosure.

As shown in FIG. 7, one HARQ entity may handle the hybrid ARQ functionality for one user per high-speed downlink shared channel, HS-DSCH, transport channel. One HARQ entity may be capable of supporting multiple instances (HARQ process) of stop and wait HARQ protocols. There may be one HARQ entity per HS-DSCH, one HARQ process per transmission time interval, TTI, for single stream transmission and two HARQ processes per TTI for dual streams, three streams and four streams transmissions.

Since, according to the embodiment of FIG. 7, only two HARQ processes are supported for three streams and four stream transmissions, there is need for a mapping table for mapping the four ACK/NAK's to two ACK/NAK's (i.e., two HARQ processes).

Table 2 shows the four different possible ACK/NAK combinations of two different streams with bundled data blocks where the receiver side produces an ACK or NAK for each of the two bundled data blocks and the HARQ process then produces a combined ACK or NAK for the bundled blocks/streams to be sent back to the transmitter side.

TABLE 2

| Input HARQ process | | Output HARQ process |
|---|---|---|
| 1$^{st}$ stream | 2$^{nd}$ stream | |
| ACK | ACK | ACK |
| ACK | NAK | NAK |
| NAK | ACK | NAK |
| NAK | NAK | NAK |

The HARQ process maps the passed transport blocks to the upper layers. That is, once the HARQ decides the transport blocks whose cyclic redundancy check (CRC) is passed (i.e., received and decoded without errors), it sends the ACK to the Node B and also tunnels these transport blocks to the upper layers (i.e., L2/L3).

Figure 8:
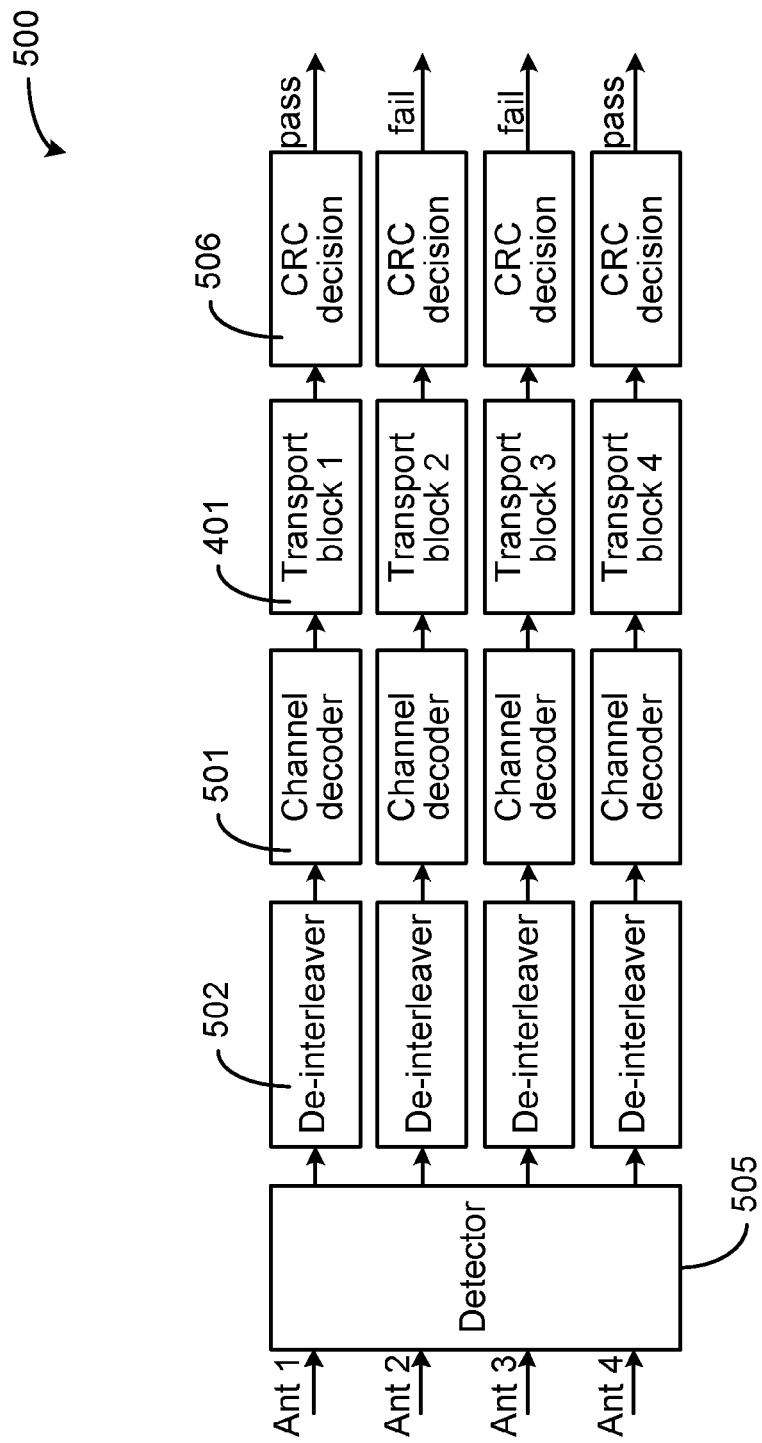
FIG. 8 is a schematic block diagram illustrating an embodiment of processing of data blocks at a receiving side in a radio communication device.

FIG. 8 schematically illustrates a part of an embodiment of a receiver arrangement 200 similar to the arrangement 500 of FIG. 6 in a 4-branch MIMO system. It is illustrating a situation where the CRC fails for two of the four data blocks 1-4 (transport blocks according to the embodiment of FIG. 8), namely blocks 2 and 3 fails, while blocks 1 and 4 pass. That the CRC fails implies that the data block was not received ok, while the data block was received ok if the CRC decision is "pass". In this situation, if a first HARQ process is applied to bundled blocks 1 and 2 and a second HARQ process is applied to bundled blocks 3 and 4, both HARQ processes will output a NAK as feedback to the transmitting side since at least one of the blocks of each bundle was not received ok (CRC failed). An exception is if internal interference reduction (discussed above) is successful for either of blocks 2 and 3, resulting in the reprocessed block 2 and/or 3 passing the CRC. If a NAK is sent for the bundle of blocks 1 and 2, both blocks will be retransmitted by the transmitting side. Similarly, if a NAK is sent for the bundle of blocks 3 and 4, both those blocks will be retransmitted by the transmitting side. As discussed above, in the case of retransmission of a bundle, processing resources and power consumption in the receiver arrangement may only need to be directed to processing the block (2 or 3) of the bundle which was not received ok (failed CRC in this case), since the receiving side has already received the other block of the bundle ok (passed CRC in this case).

Figure 9:
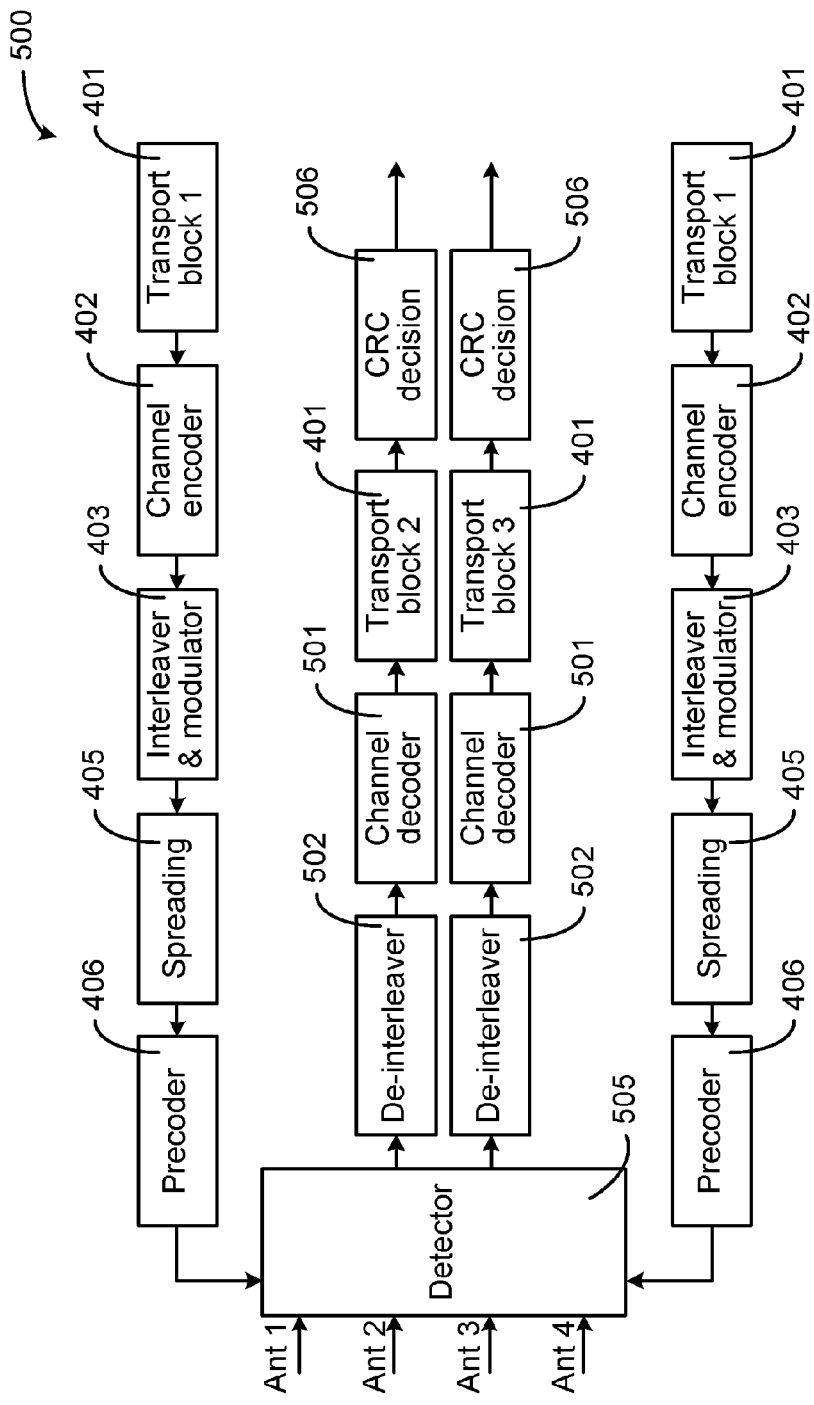
FIG. 9 is a schematic block diagram illustrating an embodiment of processing of data blocks at a receiving side in a radio communication device.

FIG. 9 schematically illustrates a part of an embodiment of a receiver arrangement 200 similar to the receiver arrangement 500 of FIG. 8 in a 4-branch MIMO system. Illustrated is the reception of the retransmission of the two bundles (blocks 1 & 2 and 3 & 4, respectively) in response to NAK feedback for these bundles since blocks 2 and 3 were not received ok as discussed above with reference to FIG. 8. Blocks 1 and 4 which were previously received ok are reconstructed and inputted to the detector of the receiver arrangement 500. The reconstruction may basically be a reversal of the processing (decoding, de-spreading etc.) previously performed for obtaining symbols of the blocks, as illustrated in FIG. 9. In the detector, the respective reconstructed blocks are subtracted from the received retransmitted bundled blocks, whereby the interference from block 1 on block 2 may be removed or reduced and the interference from block 4 on block 3 may be removed or reduced. Thus, the probability of receiving also block 2 and/or block 3 ok may be significantly increased. The receiver arrangement may thus comprise processing circuitry for reconstructing a transmitted data block, e.g. a transport block. This reconstructing circuitry may e.g. comprise the parts/modules/processing circuitry depicted in FIG. 9, such as a channel encoder, an interleaver, a modulator, a spreader, a precoder, and/or any combination thereof.

The subtraction/interference reduction in a MIMO system may be performed in any suitable way. An example is given below:

In vector notation, the $N_r$ dimension received signal at the i:th time interval, where $N_r$ denotes the number of receive antennas can be written as:

$$r_i = H_i P_i x_i + n_i \ i=1,2,\ldots,N_c \quad (1)$$

where $r_i$ is the received signal vector, $H_i$ is the MIMO channel matrix, $P_i$ is the precoding matrix, $x_i$ is the transmitted signal vector, $n_i$ is the additive white Gaussian noise (AWGN) vector and $N_c$ is the number of symbols in the packet.

At the receiver, after radio frequency (RF) processing, the $\bar{r}_i$ received signal after subtracting the already passed (i.e. received ok) transport block is given by:

$$\bar{r}_i = r_i - \tilde{H}_i \tilde{P}_p \tilde{x}_i \ i=1,2,\ldots,N_c \quad (2)$$

where $\tilde{H}_i$ is the estimated channel matrix, $\tilde{P}_i$ is the precoding matrix by taking only columns which are passed during the a previous transmission, and $\tilde{x}_i$ its the channel equivalent of reconstructed transport/data blocks. Note that it may be scalar or vector.

Figure 10:
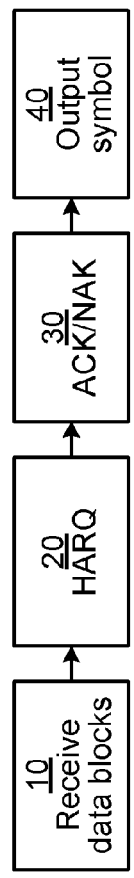
FIG. 10 is a schematic flowchart of an embodiment of a method of the present disclosure.

FIG. 10 schematically illustrates an embodiment of a method of the present disclosure. The method may be performed in a radio receiver arrangement such as in a UE or a radio base station. The method may comprise receiving 10 a plurality of data blocks over a radio interface from a transmitting side. The method may also comprise applying 20 a single HARQ process/codeword to the plurality of data blocks. The method may also comprise generating 30 an ACK for the plurality of data blocks if all of the plurality of data blocks were received ok, or generating 30 a NAK for the plurality of data blocks if at least one of the plurality of data blocks were not received ok. The method may optionally comprise outputting 40, from the receiver arrangement, symbols obtained from any of the data blocks which were received ok. The method may also comprise sending the ACK or NAK to the transmitting side. The method may optionally comprise receiving retransmission(s) of the plurality of data blocks, and applying the HARQ process thereto, until an ACK is generated for the plurality of data blocks.

Additionally or alternatively, e.g. in MIMO radio communication, if a data block bundle is retransmitted, any data block(s) of that bundle which have previously been received ok may be used in order to reduce or remove interference (e.g. in a detector of the receiver arrangement) from the retransmitted data blocks which, before the retransmission, have not yet been received ok. In order to achieve this, the ok received data blocks may be reconstructed, e.g. by processing the obtained symbols from the ok data blocks in reverse (e.g. by spreading and/or coding etc. as needed depending on the communication standard). The reconstructed data block(s) may then be subtracted (e.g. in a detector of the receiver arrangement) from the retransmitted bundled data blocks, thus removing or at least reducing any interference from the data block(s) previously received ok from the data block(s) not yet received ok. The subtraction, i.e. interference reduction, may be a type of Successive Interference Cancellation (SIC).

Additionally or alternatively, e.g. in MIMO radio communication, if any but not all data blocks of a bundle is received ok, an internal interference reduction may be performed in the receptor arrangement before sending a NAK to the transmitter side for that bundle. For instance, the block(s) which was not received ok may be reprocessed (e.g. decoded and/or de-spread etc. as needed depending on the communication standard) with subtraction of the data block(s) which were received ok. This may be a type of internal SIC which may be used to avoid retransmission or at least reduce the number of retransmissions needed. According to this embodiment of the present invention, there may not need to be any retransmission of the bundled data blocks at all. If the internal interference reduction fails to achieve ok reception of all data blocks in the bundle, a NAK may be sent to the transmitting side and interference reduction of the retransmitted data blocks may be performed as discussed above.

Figure 11:
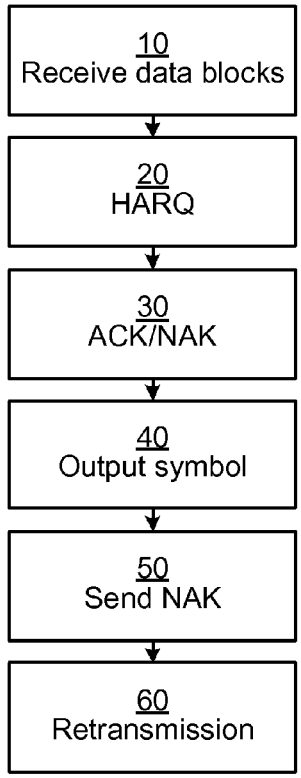
FIG. 11 is a schematic flowchart of an embodiment of a method of the present disclosure.

FIG. 11 is a flow chart illustrating an embodiment of a method of the present disclosure. The receiving 10, applying 20, generating 30 and outputting 40 is as discussed above in relation to FIG. 10. Additionally, the NAK is sent 50 to the transmitting side, and retransmission(s) of the plurality of data blocks 401 in a single HARQ process is/are received 60 until a positive acknowledgement (ACK) is generated 30 for the plurality of data blocks in response to all of the plurality of data blocks having been received 10 and 60 ok.

Figure 12:
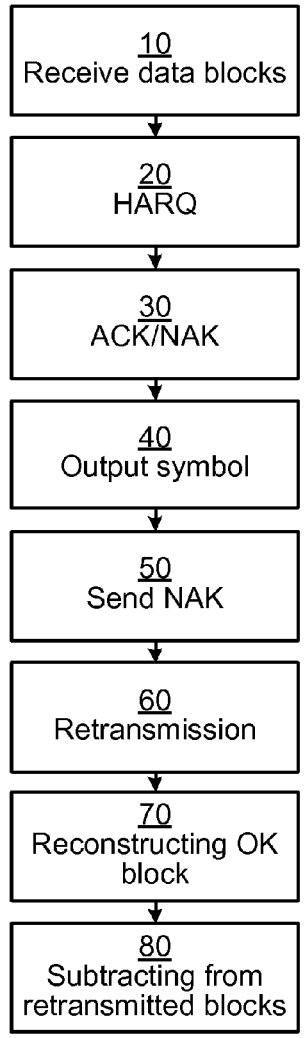
FIG. 12 is a schematic flowchart of an embodiment of a method of the present disclosure.

FIG. 12 is a flow chart illustrating an embodiment of a method of the present disclosure. The receiving 10, applying 20, generating 30, outputting 40, sending 50 NAK and receiving 60 retransmission is as discussed above in relation to FIG. 11. Additionally, the at least one data block 401) that was received 10 ok is reconstructed 70, and the reconstructed 70 data block 401 is subtracted 80 from the received 60 retransmitted plurality of data blocks.

Figure 13:
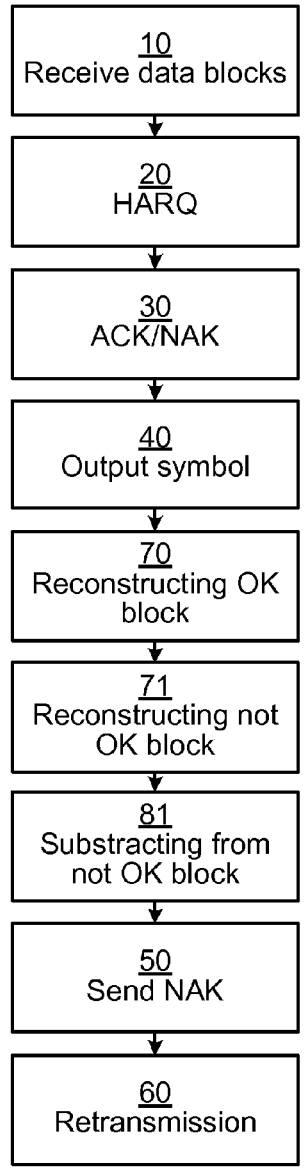
FIG. 13 is a schematic flowchart of an embodiment of a method of the present disclosure.

FIG. 13 is a flow chart illustrating an embodiment of a method of the present disclosure. The receiving 10, applying 20, generating 30 and outputting 40 is as discussed above in relation to FIG. 10. Additionally, the at least one data block 401 that was received 10 ok is reconstructed 70. Also, the at least one data block 401 that was not received ok is reconstructed 71. Then, the reconstructed data block that was received ok is subtracted 81 from the reconstructed data block that was not received ok. Depending on whether the reduction of interference was successful, a NAK may then be sent 50 to the transmitting side, and retransmitted data blocks may be received 60.

Figure 14:
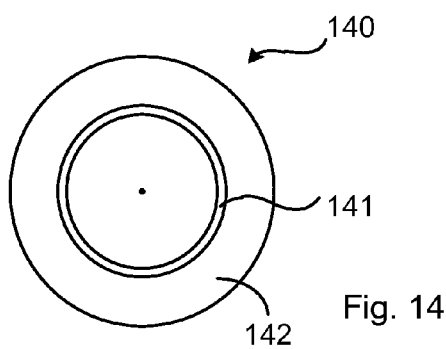
FIG. 14 is a schematic illustration of an embodiment of a computer program product of the present disclosure.

FIG. 14 illustrates a computer program product 140. The computer program product 140 comprises a computer readable medium 142 comprising a computer program 141 in the form of computer-executable components 141. The computer program/computer-executable components 141 may be configured to cause a receiver arrangement 200 of the present disclosure to perform an embodiment of the method of the present disclosure. The computer program/computer-executable components may be run on the processor 201 of the arrangement 200 for causing the arrangement to perform the method. The computer program product/computer readable medium 140 may e.g. be comprised in a storage unit or memory 202 comprised in the arrangement 200 and associated with the processor 201. Alternatively, the computer program product/computer readable medium 140 may be, or be part of, a separate, e.g. mobile, storage means, such as a computer readable disc, e.g. CD or DVD or hard disc/drive, or a solid state storage medium, e.g. a RAM or Flash memory.

Below are defined a few other exemplifying aspects of the present disclosure.

According to an aspect of the present disclosure, there is provided a receiver arrangement comprising a processor. The processor is configured for, in cooperation with a storage unit selectively storing at least one symbol obtained from at least one of a plurality of data blocks received by the receiver arrangement and on which a single hybrid automatic repeat request (HARQ) process has been applied, while waiting for at least one other symbol to be obtained from another data block of the plurality of data blocks after the plurality of data blocks has been retransmitted. The processor is also configured for outputting the at least one stored symbol together with the at least one other symbol together from the receiver arrangement.

According to an aspect of the present disclosure, there is provided a receiver arrangement 200. The arrangement comprises means 204 for receiving 10 a plurality of data blocks 401 over a radio interface in from a transmitting side. The arrangement 200 also comprises means 201 for applying 20 a single hybrid automatic repeat request (HARQ) process to the plurality of data blocks 401, whereby it is determined that at least one of the plurality of data blocks has been received 10 ok and that at least one of the plurality of data blocks has not been received 10 ok. The arrangement 200 also comprises means 201 for generating 30 a negative acknowledgement (NAK) for the plurality of data blocks 401 in response to the at least one of the plurality of data blocks having not been received 10 ok. The arrangement 200 also comprises means 201 for outputting 40, from the receiver arrangement 200, at least one symbol obtained from the at least one of the plurality of data blocks 401 which has been received 10 ok.

According to an aspect of the disclosure, there is provided a receiver arrangement configured with circuitry for performing any method embodiment discussed above. The receiver arrangement may comprise a storing means configured for selectively storing data block(s) of a bundle (e.g. as symbols derived from the transmitted data blocks) which have been received ok while waiting for other code blocks of the bundle which have not yet been received ok, e.g. waiting for retransmission of the bundled code blocks or waiting for internal interference reduction as discussed above. Additionally or alternatively, the receiver arrangement may comprise circuitry for reconstructing a code block as discussed above, from symbols to the code block as transmitted. The receiver arrangement may comprise circuitry for subtracting the reconstructed code block from retransmitted bundled code blocks. Additionally or alternatively, the receiver arrangement may comprise circuitry for internal interference reduction as discussed above. For example, the receiver arrangement may comprise circuitry for subtracting a reconstructed code block from a code block being reprocessed in the receiver arrangement. Additionally, the receiver arrangement may comprise any of the parts/modules/circuitry depicted in any of the attached FIGS. 6 and 8-9.

According to an aspect of the present disclosure, there is provided a method in a radio receiver arrangement of receiving data blocks of radio signaling. The method may comprise receiving a plurality of data blocks over a radio interface from a transmitting side. The method may also comprise applying a single HARQ process/codeword to the plurality of data blocks. The method may also comprise generating an ACK for the plurality of data blocks if all of the plurality of data blocks were received ok, or generating a NAK for the plurality of data blocks if at least one of the plurality of data blocks were not received ok. The method may optionally comprise outputting, from the receiver arrangement, symbols obtained from any of the plurality of data blocks which were received ok, possibly regardless of whether all of the plurality of data blocks were received ok. The method may also comprise sending the ACK or NAK to the transmitting side. The method may also comprise receiving retransmission(s) of the plurality of data blocks bundled together in a single HARQ process, and keep retransmitting until an ACK is generated for the plurality of data blocks.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a radio receiver arrangement for receiving data blocks of radio signaling, the method comprising:
receiving a plurality of data blocks over a radio interface from a transmitting side;
applying a single hybrid automatic repeat request (HARQ) process to the plurality of data blocks, whereby it is determined that at least one of the plurality of data blocks has been received ok and that at least one of the plurality of data blocks has not been received ok;
generating a negative acknowledgement (NAK) for the plurality of data blocks in response to the at least one of the plurality of data blocks having not been received ok;
outputting, from the receiver arrangement, at least one symbol obtained from the at least one of the plurality of data blocks which has been received ok;
reconstructing both the at least one data block that was received ok and the at least one data block that was not received ok; and
subtracting the reconstructed data block that was received ok from the reconstructed data block that was not received ok.

2. The method of claim 1, wherein the subtracting comprises successive interference cancellation (SIC).

3. A receiver arrangement comprising a processor configured to:
receive a plurality of data blocks over a radio interface from a transmitting side;
apply a single hybrid automatic repeat request (HARQ) process to the plurality of data blocks, whereby it is determined that at least one of the plurality of data blocks has been received ok and that at least one of the plurality of data blocks has not been received ok;
generate a negative acknowledgement (NAK) for the plurality of data blocks in response to the at least one of the plurality of data blocks having not been received ok;
output, from the receiver arrangement, at least one symbol obtained from the at least one of the plurality of data blocks which has been received ok;
reconstruct both the at least one data block that was received ok and the at least one data block that was not received ok; and
subtract the reconstructed data block that was received ok from the reconstructed data block that was not received ok.

4. A network node comprising a receiver arrangement comprising a processor configured to:
receive a plurality of data blocks over a radio interface from a transmitting side;
apply a single hybrid automatic repeat request (HARQ) process to the plurality of data blocks, whereby it is determined that at least one of the plurality of data blocks has been received ok and that at least one of the plurality of data blocks has not been received ok;
generate a negative acknowledgement (NAK) for the plurality of data blocks in response to the at least one of the plurality of data blocks having not been received ok;
output, from the receiver arrangement, at least one symbol obtained from the at least one of the plurality of data blocks which has been received ok;
reconstruct the at least one data block that was received ok, to obtain at least one reconstructed data block;
send the NAK to the transmitting side;
receive retransmissions of the plurality of data blocks in a single HARQ process until a positive acknowledgement (ACK) is generated for the plurality of data blocks in response to all of the plurality of data blocks having been received ok; and
subtract the at least one reconstructed data block from the received retransmitted plurality of data blocks.

5. A method in a radio receiver arrangement for receiving data blocks of radio signaling, the method comprising:
receiving a plurality of data blocks over a radio interface from a transmitting side;
applying a single hybrid automatic repeat request (HARQ) process to the plurality of data blocks, whereby it is determined that at least one of the plurality of data blocks has been received ok and that at least one of the plurality of data blocks has not been received ok;
generating a negative acknowledgement (NAK) for the plurality of data blocks in response to the at least one of the plurality of data blocks having not been received ok;
outputting, from the receiver arrangement, at least one symbol obtained from the at least one of the plurality of data blocks which has been received ok;
reconstructing the at least one data block that was received ok, to obtain at least one reconstructed data block;
sending the NAK to the transmitting side;
receiving retransmissions of the plurality of data blocks in the single HARQ process until a positive acknowledgement (ACK) is generated for the plurality of data blocks in response to all of the plurality of data blocks having been received ok; and
subtracting the at least one reconstructed data block from the received retransmitted plurality of data blocks.

6. The method of claim 5, wherein symbols of a retransmitted data block, which data block has previously been received ok, are not decoded.

7. The method of claim 5, wherein the receiver arrangement is configured for multiple input multiple output (MIMO) radio communication, and the plurality of data blocks are received via respective antennas.

8. The method of claim 5, wherein the receiver arrangement is configured for time division duplex (TDD) radio communication.

9. The method of claim 5, wherein whether each of the plurality of data blocks is received ok is determined by means of an error detection code included in each of the received data blocks.

10. The method of claim 9, wherein the error detection code is a cyclic redundancy check (CRC) code.

11. A receiver arrangement comprising a processor configured to:
- receive a plurality of data blocks over a radio interface from a transmitting side;
- apply a single hybrid automatic repeat request (HARQ) process to the plurality of data blocks, whereby it is determined that at least one of the plurality of data blocks has been received ok and that at least one of the plurality of data blocks has not been received ok;
- generate a negative acknowledgement (NAK) for the plurality of data blocks in response to the at least one of the plurality of data blocks having not been received ok;
- output, from the receiver arrangement, at least one symbol obtained from the at least one of the plurality of data blocks which has been received ok;
- reconstruct the at least one data block that was received ok, to obtain at least one reconstructed data block;
- send the NAK to the transmitting side;
- receive retransmissions of the plurality of data blocks in a single HARQ process until a positive acknowledgement (ACK) is generated for the plurality of data blocks in response to all of the plurality of data blocks having been received ok; and
- subtract the at least one reconstructed data block from the received retransmitted plurality of data blocks.

12. A user equipment including a receiver arrangement comprising a processor configured to:
- receive a plurality of data blocks over a radio interface from a transmitting side;
- apply a single hybrid automatic repeat request (HARQ) process to the plurality of data blocks, whereby it is determined that at least one of the plurality of data blocks has been received ok and that at least one of the plurality of data blocks has not been received ok;
- generate a negative acknowledgement (NAK) for the plurality of data blocks in response to the at least one of the plurality of data blocks having not been received ok;
- output, from the receiver arrangement, at least one symbol obtained from the at least one of the plurality of data blocks which has been received ok;
- reconstruct the at least one data block that was received ok, to obtain at least one reconstructed data block;
- send the NAK to the transmitting side;
- receive retransmissions of the plurality of data blocks in a single HARQ process until a positive acknowledgement (ACK) is generated for the plurality of data blocks in response to all of the plurality of data blocks having been received ok; and
- subtract the at least one reconstructed data block from the received retransmitted plurality of data blocks.

13. A non-transitory computer program comprising computer program code stored in a computer-readable medium, said computer program code configured to, when run on a processor associated with a receiver arrangement, cause the receiver arrangement to:
- receive a plurality of data blocks over a radio interface from a transmitting side;
- apply a single hybrid automatic repeat request (HARQ) process to the plurality of data blocks, whereby it is determined that at least one of the plurality of data blocks has been received ok and that at least one of the plurality of data blocks has not been received ok;
- generate a negative acknowledgement (NAK) for the plurality of data blocks in response to the at least one of the plurality of data blocks having not been received ok;
- output, from the receiver arrangement, at least one symbol obtained from the at least one of the plurality of data blocks which has been received ok; reconstruct the at least one data block that was received ok, to obtain at least one reconstructed data block;
- send the NAK to the transmitting side;
- receive retransmissions of the plurality of data blocks in a single HARQ process until a positive acknowledgement (ACK) is generated for the plurality of data blocks in response to all of the plurality of data blocks having been received ok; and
- subtract the at least one reconstructed data block from the received retransmitted plurality of data blocks.

\* \* \* \* \*